(12) United States Patent
Sakurai (10) Patent No.: US 11,367,920 B2
(45) Date of Patent: Jun. 21, 2022

(54) BATTERY PACK

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 16/877,514

(22) Filed: May 19, 2020

(65) Prior Publication Data

US 2020/0373530 A1   Nov. 26, 2020

(30) Foreign Application Priority Data

May 22, 2019   (JP) .............................. JP2019-095830

(51) Int. Cl.
*H01M 50/20* (2021.01)
*H01M 50/543* (2021.01)

(52) U.S. Cl.
CPC ......... *H01M 50/20* (2021.01); *H01M 50/543* (2021.01); *H01M 2220/20* (2013.01)

(58) Field of Classification Search
CPC ............... H01M 50/20; H01M 50/543; H01M 2220/20; H01M 10/4207; Y02E 60/10; H01R 4/625
See application file for complete search history.

(56) References Cited

U.S. PATENT DOCUMENTS

| 8,956,753 | B2 | 2/2015 | Byun et al. | |
|---|---|---|---|---|
| 9,350,007 | B2* | 5/2016 | Oda | H01M 50/502 |
| 9,525,228 | B2* | 12/2016 | Oda | H01R 13/03 |
| 2006/0091855 | A1* | 5/2006 | Seo | H01M 50/112 |
| | | | | 320/116 |
| 2011/0064993 | A1* | 3/2011 | Ochi | H01M 50/54 |
| | | | | 429/158 |

(Continued)

FOREIGN PATENT DOCUMENTS

| JP | 5157214 B2 | 3/2013 |
|---|---|---|
| JP | 5342590 B2 | 11/2013 |
| JP | 5528746 B2 | 6/2014 |

*Primary Examiner* — Michael L Dignan
(74) *Attorney, Agent, or Firm* — CKC & Partners Co., LLC (57) ABSTRACT

Provided is a battery pack that, even in a case in which a metal plate and an electrode terminal are made of different metals, can increase reliability of the connection strength by welding them and can be configured at a low cost. A battery pack 1 includes adjacent battery cells 2 having positive and negative electrode terminals connected each other by a metal plate 3, and a dissimilar material bonding plate 4 having a terminal insertion hole 43 is disposed above a terminal connection hole 32, which is a long hole or a loose hole, into which an electrode terminal 24 composed of a different kind of metal from the metal plate 3. The dissimilar material bonding plate 4 includes a stack of a first plate 41 and a second plate 42 that are composed of different kinds of metal from each other, and an outer diameter of the second plate 42 is larger than that of the first plate 41, in which the first plate 41 is composed of a metal of the same element as a metal that forms the electrode terminal 24, and welded to the electrode terminal 24, and the second plate 42 is composed of a metal of the same element as a metal that forms the metal plate 3, and welded to the metal plate 3.

6 Claims, 9 Drawing Sheets

(56) References Cited

U.S. PATENT DOCUMENTS

2013/0183574 A1\* 7/2013 Asai .................. H01M 10/34
                                                                           429/159
2014/0178755 A1\* 6/2014 Oda .................... H01M 50/538
                                                                           429/211

\* cited by examiner

BATTERY PACK

This application is based on and claims the benefit of priority from Japanese Patent Application No. 2019-95830, filed on 22 May 2019, the content of which is incorporated herein by reference.

BACKGROUND OF THE INVENTION

Field of the Invention

The present invention relates to a battery pack.

Related Art

A battery pack is configured by stacking a plurality of battery cells and electrically connecting adjacent battery cells. For example, in a case in which a high output voltage is required, such as a battery used in an electric vehicle or a hybrid vehicle, a plurality of battery cells is connected in series by electrically connecting the positive and negative electrode terminals of adjacent battery cells by a metal plate.

However, in the battery cell, positive and negative electrode terminals are sometimes formed by different kinds of metals. For example, in a lithium-ion battery cell, the positive electrode terminal is formed of an aluminum alloy, and the negative electrode terminal is formed of a copper alloy. In the battery pack configured by such a battery cell, in a case in which an aluminum alloy as a metal plate for example is connected by welding to each electrode terminal, the welding of the metal plate and the negative electrode terminal is a welding between different kinds of metals. Therefore, the reliability of the connection strength may be lowered as compared with a case in which the same kind of metal is welded together.

Conventionally, Japanese Patent No. 5,528,746 discloses a battery pack in which a metal plate is formed of a clad material in which a first metal plate and a second metal plate are bonded between the positive and negative electrode terminals.

Furthermore, Japanese Patent No. 5,157,214 discloses a battery including a battery case made of a first metal and having a recess formed therein, a current supply lead plate made of a second metal, and a connecting member for connecting the battery case and the current supply lead plate In this battery, the connecting member is configured by using a metal that is weldable with the first metal, a first connecting layer to be welded at the recess of the battery case, and a metal that is weldable with the second metal. The current supply lead plate is welded to the connecting member, and a second connecting layer having an area larger than the opening area of the recess is stacked.

Furthermore, Japanese Patent No. 5,342,590 discloses a secondary cell including an electrode rivet that is electrically connected to any one electrode of the electrode assembly and made of a first metal, a rivet terminal made of a second metal different from the first metal, and a clad metal interposed between the electrode rivet and the rivet terminal. The clad metal includes an outer layer surrounding the inner layer. The outer layer is made of the second metal and is welded to the rivet terminal. The inner layer is made of the first metal and is welded to the electrode rivet.

Patent Document 1: Japanese Patent No. 5,528,746
Patent Document 2: Japanese Patent No. 5,157,214
Patent Document 3: Japanese Patent No. 5,342,590

SUMMARY OF THE INVENTION

According to the prior art referred to above, it is possible to electrically connect the connecting portions of the same type of metal to each other. Therefore, even when welding the connecting portions, it is possible to perform highly reliable welding for the connection strength.

However, it is necessary for the metal plate to be formed to have a size that can cover each electrode terminal over both the adjacent positive and negative electrode terminals, and furthermore, it is also necessary for the metal plate to be set to have a cross-sectional area corresponding to the current value flowing between the electrode terminals. In general, metal plates made of a clad material are expensive. In applications such as a case in which high output voltage is required, in particular, such as an electric vehicle or a hybrid vehicle, it is difficult to make the metal plate smaller. Therefore, as described in Japanese Patent No. 5,528,746, in a case in which the metal plate itself is formed of a clad material, there is a problem in that the battery pack becomes expensive.

In addition, in the technology described in Japanese Patent No. 5,157,214, since connecting components made of different metals are subjected to penetration welding at the time of welding, there is a possibility that different metal, materials are mixed at the time of welding, and in this respect, there remains a problem in reliability of the connection strength. Moreover, since it is penetration welded over the respective connecting parts stacked in the height direction, there is a problem in that it is not possible to absorb the positional deviation in the height direction of each connecting portion.

Furthermore, in the technology described in Japanese Patent No. 5,342,590, by providing the clad metal so as to fit between the outer periphery of the electrode rivet, and the inner periphery of the rivet terminal, both side surfaces of the inner layer and the outer layer of the clad metal are bonded. Therefore, it is necessary for the electrode rivet, the rivet terminal, and the clad metal to be in contact with each other without any gap, and hence, there is a problem in that the positional deviation in the lateral direction (radial direction) at their connecting portions cannot be absorbed.

To address this, it is an object of the present invention to provide a battery pack that, even in a case in which a metal plate and an electrode terminal are made of different metals, can increase reliability of the connection strength by welding them and can be configured at a low cost, and further can absorb a positional deviation in the height direction and the lateral direction of a connecting portion.

A battery pack (for example, a battery pack 1 to be described later) according to the first aspect of the present invention includes: a plurality of battery cells (for example, a battery cell 2 to be described later) that is stacked and includes positive and negative electrode terminals (for example, a positive electrode terminal 23, a negative electrode terminal 24 to be described later), the plurality of battery cells being serially connected by connecting the positive electrode terminal of one battery cell with the negative electrode terminal of another battery cell adjacent to the one battery cell, by metal plates (for example, metal plates 3 to be described later) each having two terminal connection holes (for example, terminal connection holes 31, 32 to be described later) into which the respective electrode terminals are to be inserted, in which at least one of the two terminal connection holes (for example, the terminal connection hole 32 to be described later) is a long hole or a loose hole that allows the electrode terminal inserted into the terminal connection hole to move in a stacking direction of the battery cells; and a dissimilar material bonding plate (for example, dissimilar material bonding plates 4, 5 to be described later), in which the electrode terminal (for example, the negative electrode terminal 24 to be described later) composed of a different metal from the metal plate of the positive and negative electrode terminal is to be inserted into the terminal connection hole which is the long hole or the loose hole, and the dissimilar material bonding plate having a terminal insertion hole (for example, terminal insertion holes 43, 53 to be described later) into which the electrode terminal extending through the terminal connection hole is to be inserted is disposed above the terminal connection hole, in which the dissimilar material bonding plate includes a stack of a first plate (for example, first plates 41, 51 to be described later) and a second plate (for example, second plates 42, 52 to be described later) that are composed of different metals from each other, and an outer diameter of the second plate is larger than that of the first plate, in which the first plate is composed of a metal of the same element as a metal that forms the electrode terminal that is to be inserted into the terminal insertion hole, and welded to the electrode terminal that is to be inserted into the terminal insertion hole, and in which the second plate is composed of a metal of the same element as a metal that forms the metal plate, and welded to the metal plate.

According to the first aspect, even in a case in which a metal plate and an electrode terminal are made of different metals, it is unnecessary to use an expensive clad material in the metal plate, and since a metal of the same element can be used for the weld portion for electrically connecting them, it is possible to increase reliability of the connection strength by welding of the metal plate and the electrode terminal and can be configured at a low cost. Furthermore, since the dissimilar material bonding plate is disposed above the terminal connection hole composed of a long hole or a loose hole into which the electrode terminal is inserted, and placed on the metal plate by inserting into the terminal insertion hole formed in the dissimilar material bonding plate, it is possible to absorb a positional deviation in the height direction and the lateral direction among the electrode terminal, the metal plate, and the dissimilar material bonding plate, and the assembly property is favorable.

According to the second aspect of the present invention, in the battery pack according to the first aspect, an insulating member (for example, an insulating member 6 to be described later) may be disposed between the metal plate and the electrode terminal that is to be inserted into the terminal insertion hole of the dissimilar material bonding plate.

According to the second aspect, electrolytic corrosion due to the contact between the different metals of the electrode terminal and the metal plate is prevented, and hence, it is possible to maintain a low-resistance connection state over a long period of time.

According to the third aspect of the present invention, in the battery pack according to the first aspect or the second aspect, the dissimilar material bonding plate may include a stack of the first plate and the second plate in a radial direction, and have the terminal insertion hole in the first plate.

According to the third aspect, the dimension of the dissimilar material bonding plate in the thickness direction is suppressed, it is possible to stack the first plate and the second plate, and thus, it is possible to make the electrical connection between the electrode terminal and the metal plate compact.

According to the fourth aspect of the present invention, in the battery pack according to the third aspect, the dissimilar material bonding plate may be a clad tube.

According to the fourth aspect, it is possible to easily configure a compact dissimilar material bonding plate in which the dimension in the thickness direction is suppressed. Since a clad tube is smaller than the metal plate, it is possible to curb an increase in cost.

According to the fifth aspect of the present invention, in the battery pack according to the first aspect or the second aspect, the dissimilar material bonding plate may include a stack of the first plate and the second plate in a thickness direction, and have the terminal insertion hole formed over the first plate and the second plate.

According to the fifth aspect, it is possible to easily configure a compact dissimilar material bonding plate simply by stacking in the thickness direction the first plate and the second plate having different outer diameter dimensions.

According to the sixth aspect of the present invention, in the battery pack according to any one of the first aspect to the fifth aspect, the positive and negative electrode terminals may be respectively an aluminum alloy and a copper alloy, the metal plate may be an aluminum alloy, the first, plate of the dissimilar material bonding plate may be a copper alloy, and the second plate of the dissimilar material bonding plate may be an aluminum alloy, and the battery cells may be lithium-ion battery cells.

According to the sixth aspect, it is possible to reduce the weight and cost of the battery pack by reducing the weight and cost of the metal plate. Furthermore, it is possible to further improve reliability of the connection strength between the metal plate and the electrode terminal by using a copper alloy having a higher strength (tensile strength) than an aluminum alloy of the second plate for the first plate in which the welding length is shorter than the second plate. Moreover, since a copper alloy is favorable in electrical resistance and thermal conductivity, by using the copper alloy for the first plate, local heat generation and temperature rise is suppressed, thereby leading to further improvement in conduction performance.

According to the seventh aspect of the present invention, in the battery pack according to any one of the first aspect to the fifth aspect, tensile strength of the first plate may be larger than tensile strength of the second plate.

According to the seventh aspect, since the strength of the first plate having a shorter weld length can be increased, it is possible to further improve reliability of the connection strength.

According to the eighth aspect of the present invention, in the battery pack according to any one of the first aspect to the fifth aspect, the metal plate may be composed of a metal having a smaller density than a metal forming at least one of the positive and negative electrode terminals.

According to the eighth aspect, it is possible to reduce the weight and cost of the battery pack by reducing the weight and cost of the metal plate.

According to the present invention, it is possible to provide a battery pack that, even in a case in which a metal plate and an electrode terminal are made of different metals, can increase reliability of the connection strength by welding them and can be configured at a low cost, and further can absorb a positional deviation in the height direction and the lateral direction of a connecting portion.

DETAILED DESCRIPTION OF THE INVENTION

Hereinafter, a detailed description will be given of embodiments of a battery pack of the present disclosure with reference to the drawings.

First Embodiment

Figure 1:
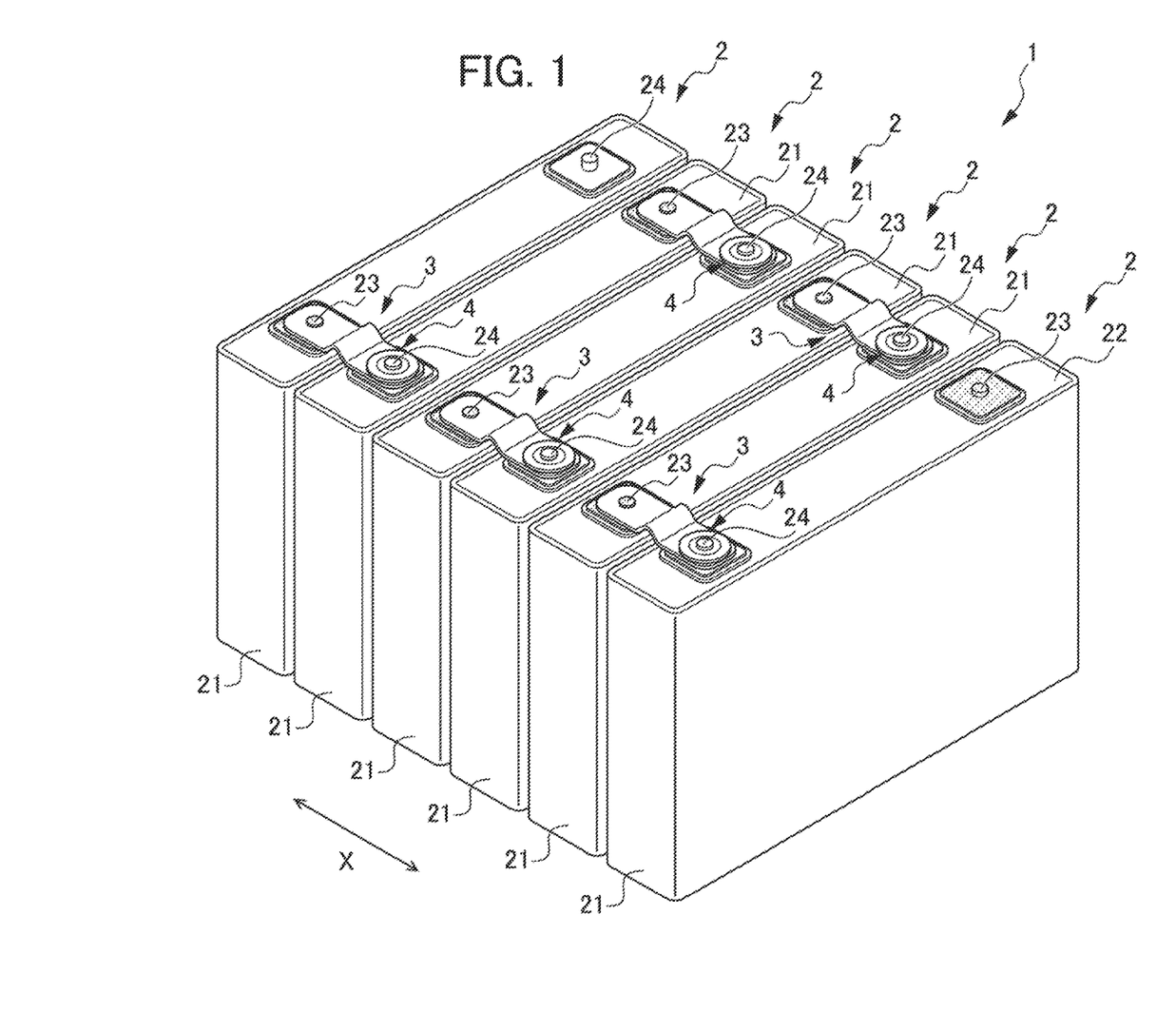
FIG. 1 is a perspective view showing a battery pack according to a first embodiment.
Figure 2:
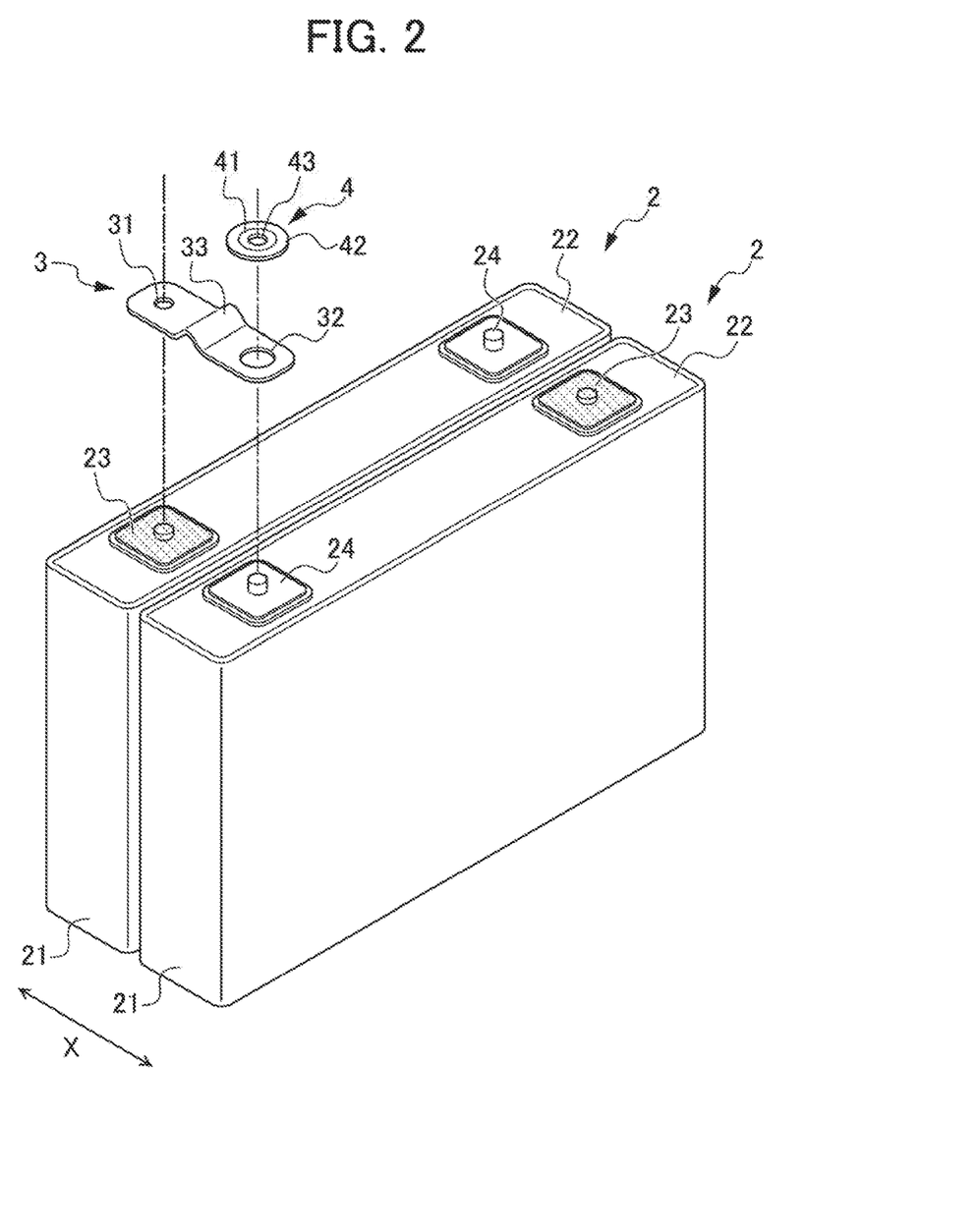
FIG. 2 is an exploded perspective view showing two adjacent battery cells in the battery pack according to the first embodiment.
Figure 3:
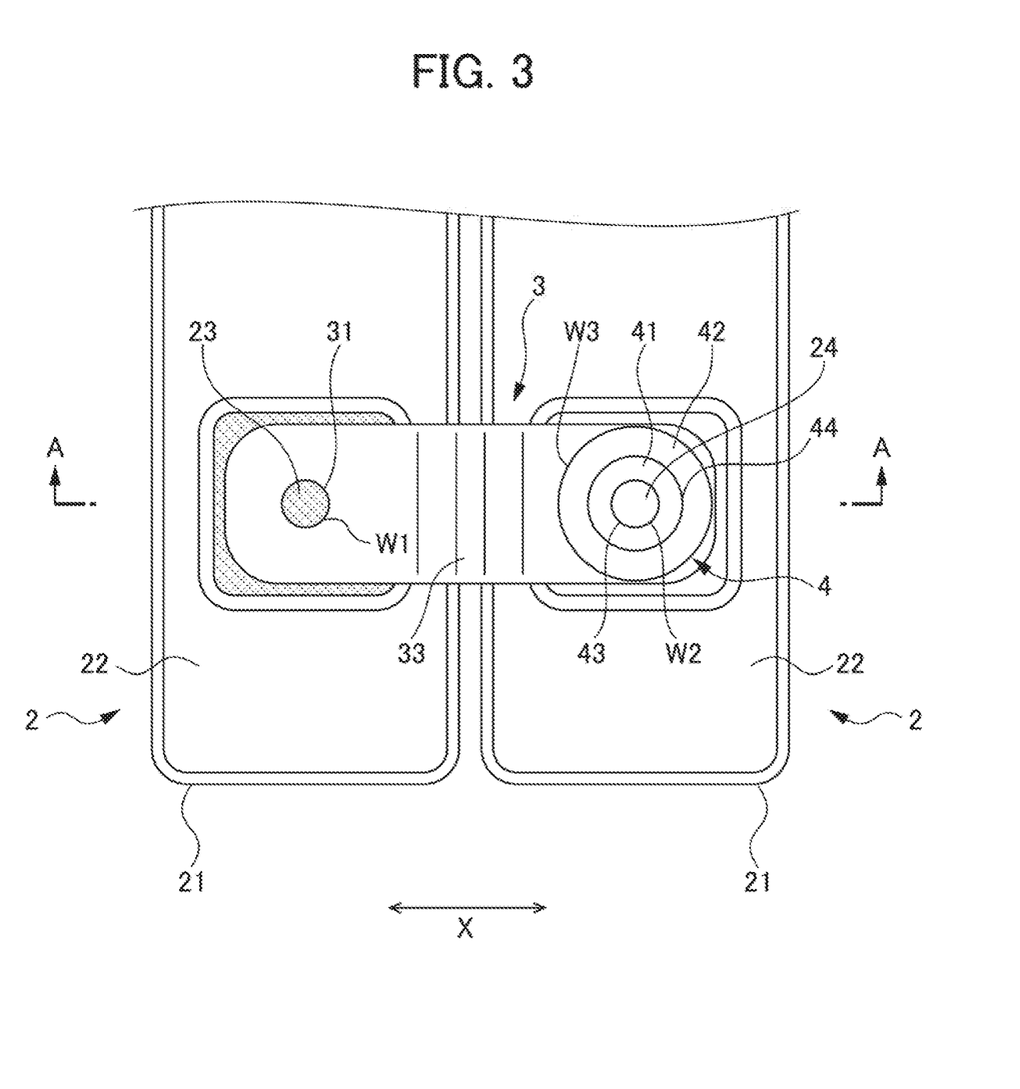
FIG. 3 is an enlarged plan view showing a connecting portion between one of the electrode terminals in two adjacent battery cells.
Figure 4:
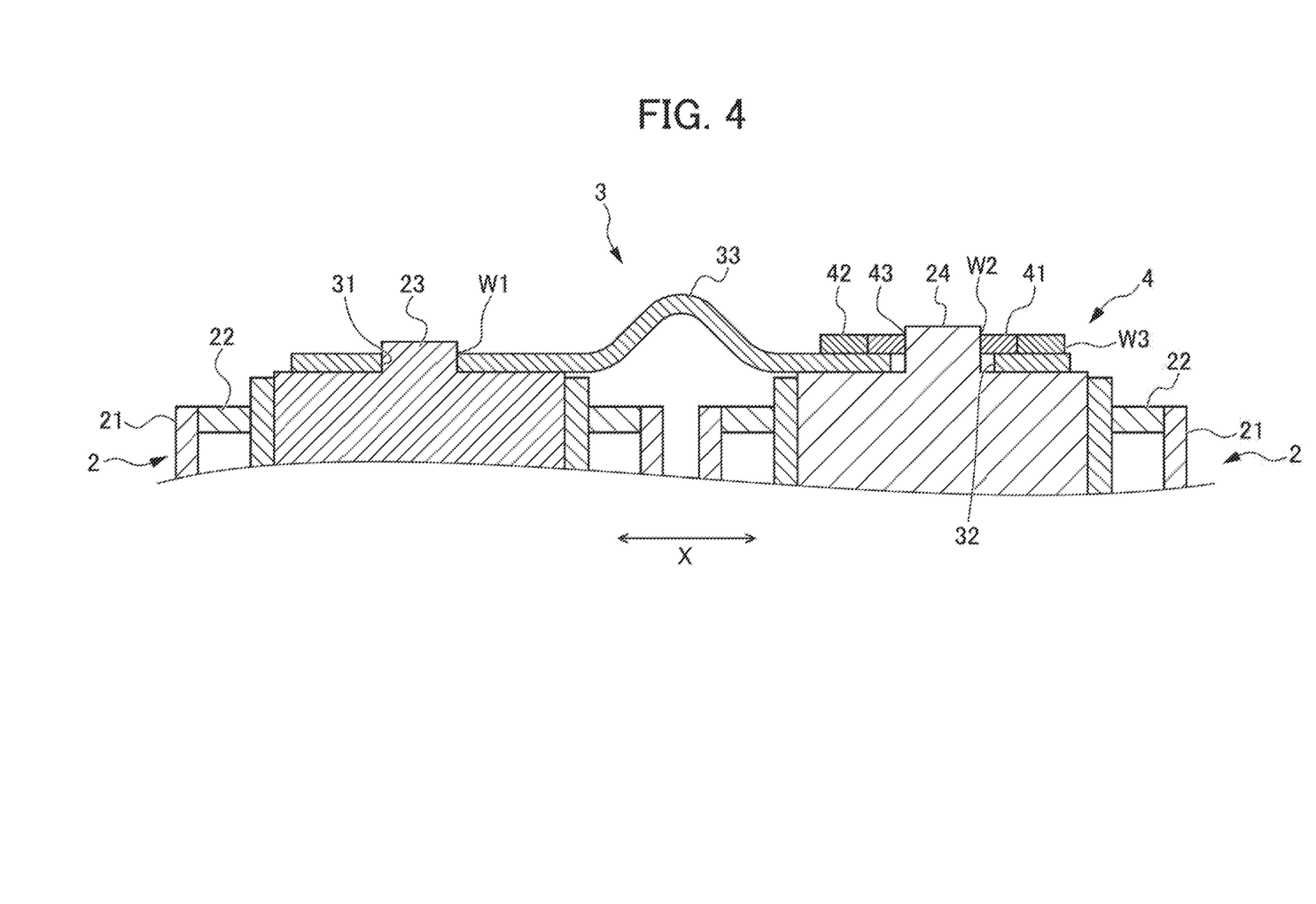
FIG. 4 is a cross-sectional view taken along line A-A in FIG. 3.
Figure 5:
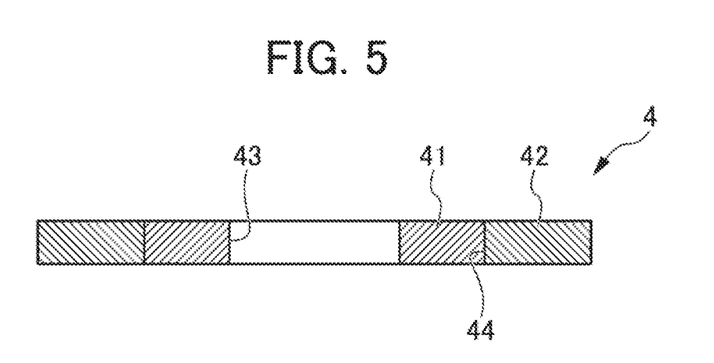
FIG. 5 is a longitudinal cross-sectional view of a dissimilar material bonding plate in the first embodiment.

FIG. 1 is a perspective view showing a battery pack according to the first embodiment. FIG. 2 is an exploded perspective view showing two adjacent battery cells in the battery pack according to the first embodiment. FIG. 3 is an enlarged plan view showing a connecting portion between one of the electrode terminals in the two adjacent battery cells. FIG. 4 is a cross-sectional view taken along line A-A in FIG. 3. FIG. 5 is a longitudinal sectional view of a dissimilar material bonding plate in the first embodiment.

A battery pack 1 is configured by stacking a plurality of battery cells 2 along one direction (X direction in the drawings).

The battery cells 2 each store electrode materials of the positive and negative electrodes (not shown) together with an electrolytic solution (not shown) in the interior of a cell can 21 made of a metal material such as an aluminum alloy and composed of a box-type container having a bottom, and are each configured by sealing the upper surface by a sealed body 22 made of a metal material such as an aluminum alloy. The sealed body 22 includes a pair of electrode terminals of a positive electrode terminal 23 connected to the positive electrode material in the cell can 21 and a negative electrode terminal 24 connected to the negative electrode material in the cell can 21 in such a manner that the pair of the electrode terminals is provided to protrude and to be spaced apart from each other in a direction perpendicular to the stacking direction (X direction) of the battery cell 2.

The positive electrode terminal 23 and the negative electrode terminal 24 are formed of different metals. In the present embodiment, a case in which the battery cell 2 is a lithium ion battery cell is shown. The positive electrode terminal 23 is formed of an aluminum alloy, and the negative electrode terminal. 24 is formed of a copper alloy.

Each of the battery cells 2 configuring the battery pack 1 has a surface including the positive electrode terminal 23 and the negative electrode terminal 24 provided thereon as the same side, and is oriented such that the positive electrode terminal 23 and the negative electrode terminal 24 are alternately arranged along the stacking direction of the battery cell 2. The positive electrode terminal 23 and the negative electrode terminal 24 of the adjacent battery cells 2 and 2 are electrically connected by a metal plate 3. Thus, a plurality of battery cells 2 configuring the battery pack 1 is connected in series.

It should be noted that, in general, the battery pack 1 is configured by providing an end plate on both end surfaces in the stacking direction of the battery cell 2 in which a plurality of layers is stacked, and integrally binding both end plates by a binding bar in a state in which the battery cells 2 in a stacked state are compressed. However, in FIG. 1, the illustration of the end plate and the binding bar is omitted. The number of battery cells 2 configuring the battery pack 1 is not limited to the number shown in the drawings.

The metal plate 3 has a length and a size extending over the positive electrode terminal 23 and the negative electrode terminal 24 of the adjacent battery cells 2 and 2. In order to be able to absorb the displacement during vibration or expansion occurring between the adjacent, battery cells 2 and 2, substantially the central portion in the longitudinal direction of the metal plate 3 may have a curved portion 33 formed by curving upward. Terminal connection holes 31 and 32 made by a through hole through which the positive electrode terminal 23 or the negative electrode terminal 24 is inserted, respectively, are formed in both ends of the metal plate 3. In the present embodiment, the positive electrode terminal 23 of one of adjacent two battery cells 2 and 2 is inserted into one terminal connection hole 31 of the metal plate 3, and the negative electrode terminal 24 of the other one of the adjacent two battery cells 2 and 2 is inserted into the other terminal connection hole 32 of the metal plate 3.

The metal plate 3 is formed of metals of the same element as the metal forming either one of the positive electrode terminal 23 and the negative electrode terminal 24. Specifically, the metal plate 3 of the present embodiment is formed of an aluminum alloy which is the same as that forming the positive electrode terminal 23. That is, the metal plate 3 and the positive electrode terminal 23 are metals of the same element. However, the metal plate 3 and the negative electrode terminal 24 are metals of different elements. Since the metal plate 3 is formed of an aluminum alloy having a smaller density than the copper alloy forming the negative electrode terminal 24, it is possible to reduce the weight and cost of the battery pack 1.

At least one of the two terminal connection holes 31 and 32 of the metal plate 3 is formed by a long hole or a loose hole. The long hole is a hole in which the width perpendicular to the stacking direction of the battery cell 2 is substantially equal to the outer diameter of the positive electrode terminal 23 or the negative electrode terminal 24, and the length along the stacking direction of the battery cell 2 is larger than the outer diameter of the positive electrode terminal 23 or the negative electrode terminal 24. The loose hole is a hole having an inner diameter larger than the outer diameter of the positive electrode terminal 23 or the negative electrode terminal 24. Since both the long hole and the loose hole are larger than the outer diameter of the positive electrode terminal 23 or the negative electrode terminal 24, the positive electrode terminal 23 or the negative electrode terminal 24 inserted into the terminal connection holes 31 and 32 composed of the long hole or the loose hole is movable in the stacking direction of the battery cell 2. In the present embodiment, the terminal connection hole 32 through which the negative electrode terminal 24 is inserted is configured by the long hole or the loose hole larger than the outer diameter of the negative electrode terminal 24. With such a configuration, the variation in the lateral distance between the positive electrode terminal 23 and the negative electrode terminal 24 which are electrically connected by the metal plate 3, or the variation in the lateral distance between the two terminal connection holes 31 and 32 of the metal plate 3 can be absorbed.

In the metal plate 3 of the present embodiment, the inner diameter of the terminal connection hole 31 into which the positive electrode terminal 23 is inserted has substantially the same diameter as the outer diameter of the positive electrode terminal 23. As shown in FIGS. 3 and 4, a welded portion W1 is formed by being laser welded along the contact portion between the inner periphery of the terminal connection hole 31 and the outer periphery of the positive electrode terminal 23 of the metal plate 3. Since the welded portion W1 is a welded portion with the metals of the same element of an aluminum alloy (the positive electrode terminal 23) and an aluminum alloy (the metal plate 3), it is possible to establish a favorable connection state with reliability of the connection strength.

A dissimilar material bonding plate 4 for electrically connecting the negative electrode terminal 24 and the metal plate 3 serving as a relationship of different metals is disposed above one of the two terminal connection holes 31 and 32 of the metal plate 3 (in the present embodiment, terminal connection hole 32). The dissimilar material bonding plate 4 is configured by stacking plates composed of at least two different metal plates of a first plate 41 and a second plate 42. In the present embodiment, the first plate 41 is formed of metals of the same element as that of the negative electrode terminal 24. The second plate 42 is formed of metals of the same element as that of the metal plate 3. Specifically, in the present embodiment, the first plate 41 is a copper alloy, and the second plate 42 is an aluminum alloy.

The first plate 41 and the second plate 42 have different outer diameter dimensions. The outer diameter of the second plate 42 is greater than the outer diameter of the first plate 41. The dissimilar material bonding plate 4 of the present embodiment is configured such that the first plate 41 and the second plate 42 are stacked in the radial direction to set the second plate 42 on the outer diameter side, and the annular second plate 42 is disposed so as to surround the outer periphery of the first plate 41 on the inner diameter side. With such a configuration, the first plate 41 and the second plate 42 can be stacked while suppressing the dimension in the thickness direction of the dissimilar material bonding plate 4.

In the dissimilar material bonding plate 4, a terminal insertion hole 43 into which the negative electrode terminal 24 extending through the terminal connection hole 32 of the metal plate 3 is to be inserted is formed at the central portion of the first plate 41 disposed on the inner diameter side. The terminal insertion hole 43 has substantially the same diameter as the outer diameter of a portion which is to be inserted into the terminal insertion hole 43 at the negative electrode terminal 24. The negative electrode terminal 24 extends through the terminal insertion hole 43. Therefore, the negative electrode terminal 24 is formed so that the protrusion upward is higher than the positive electrode terminal 23 by an amount corresponding to the thickness of the dissimilar material bonding plate 4.

As shown in FIG. 5, the first plate 41 and the second plate 42 are bonded in advance so that the boundary portion 44 between the plates 41 and 42 is in a conductive state. Such a dissimilar material bonding plate 4 can be formed by bonding the first plate 41 and the second plate 42 by an appropriate method such as diffusion bonding or ultrasonic bonding. However, the dissimilar material bonding plate 4 may be configured by a clad tube. In the case of the present embodiment, the dissimilar material bonding plate 4 is configured by a clad tube in which the first plate 41 of the inner diameter side is a copper alloy, and the second plate 42 of the outer diameter side is an aluminum alloy. With such a configuration, it is possible to easily configure a compact dissimilar material bonding plate 4 in which the dimension in the thickness direction is suppressed. Since the clad tube is much smaller than the size of the metal plate 3, even when using the clad tube as the dissimilar material bonding plate 4, an increase in cost can be curbed.

It should be noted that, as shown in FIGS. 1 to 3, the outer shapes of the first plate 41 and the second plate 42 of the present embodiment are ail formed in an annular disc shape having a thickness sufficiently smaller than the outer diameter, and are stacked in the radial direction so as to be concentric. However, the outer shapes of the first plate 41 and the second plate 42 are not limited thereto.

By inserting the negative electrode terminal 24 extending through the terminal connection hole 32 of the metal plate 3 into the terminal insertion hole 43, as shown in FIG. 4, the dissimilar material bonding plate 4 is placed on the upper surface of the metal plate 3 around the terminal connection hole 32. Thereafter, as shown in FIGS. 3 and 4, a welded portion W2 is formed by performing laser welding along the contact portion between the inner periphery of the terminal insertion hole 43 of the first plate 41 of the inner diameter side and the outer periphery of the negative electrode terminal 24. Furthermore, a welded portion W3 is formed by performing laser welding along the contact portion between the outer periphery of the second plate 42 on the outer diameter side and the metal plate 3. The welded portion W2 is a welded portion by metals of the same element of a copper alloy (the negative electrode terminal 24) and a copper alloy (the first plate 41), and the welded portion W3 is a welded portion by metals of the same element of an aluminum alloy (the metal plate 3) and an aluminum alloy (the second plate 42). Therefore, since any of the welded portions W2 and W3 is a weld portion by metals of the same element, there is no possibility that different metal materials are mixed. Therefore, it is possible to increase reliability of the connection strength by welding between the metal plate 3, and the positive electrode terminal 23 and the negative electrode terminal 24. Moreover, since it is not necessary to use an expensive clad material for the metal plate 3, it is possible to configure the battery pack 1 at a low cost.

The dissimilar material bonding plate 4 is disposed above the terminal connection hole 32 composed of a long hole or loose hole into which the negative electrode terminal 24 is inserted, and is placed on the metal plate 3 by inserting the negative electrode terminal 24 into the terminal insertion hole 43 formed in the dissimilar material bonding plate 4. Therefore, even if the positional deviation in the height direction and the lateral direction occurs between the metal plate 3 and the dissimilar material bonding plate 4, the positional deviation is easily absorbed, thereby leading to assembly property of the battery pack 1 becoming favorable.

The dissimilar material bonding plate 4 of the present embodiment is configured by stacking the first plate 41 and the second plate 42 in the radial direction. Therefore, the dimension of the dissimilar material bonding plate 4 in the thickness direction is suppressed, and thus, it is possible to make the electrical connection between the negative electrode terminal 24 and the metal plate 3 compact. Moreover, since the distance between the welded portion W2 of the dissimilar material bonding plate 4 and the negative electrode terminal 24, and the welded portion W3 of the dissimilar material bonding plate 4 and the metal plate 3 can be increased, the risk of short circuit between the welded portions W2 and W3 can also be avoided.

It should be noted that, in general, when comparing the tensile strength between a copper alloy and an aluminum alloy, the copper alloy is higher than the aluminum alloy. For this reason, as in the dissimilar material bonding plate 4 of the present embodiment, by using a copper alloy for the first plate 41 in which the welding length is shorter than the second plate 42, it is possible to further improve the reliability of the connection strength between the metal plate 3 and the positive electrode terminal 23 and the negative electrode terminal 24. Moreover, since the copper alloy is also favorable in electrical resistance and thermal conductivity, by using the copper alloy for the first plate 41, local heat generation and temperature rise is suppressed, thereby leading to further improvement in conduction performance. Such a combination of the metals of the metal plate 3, the dissimilar material bonding plate 4, the positive electrode terminal 23, and the negative electrode terminal 24 is most suitable when using a lithium ion battery cell as the battery cell 2 configuring the battery pack 1.

Second Embodiment

Figure 6:
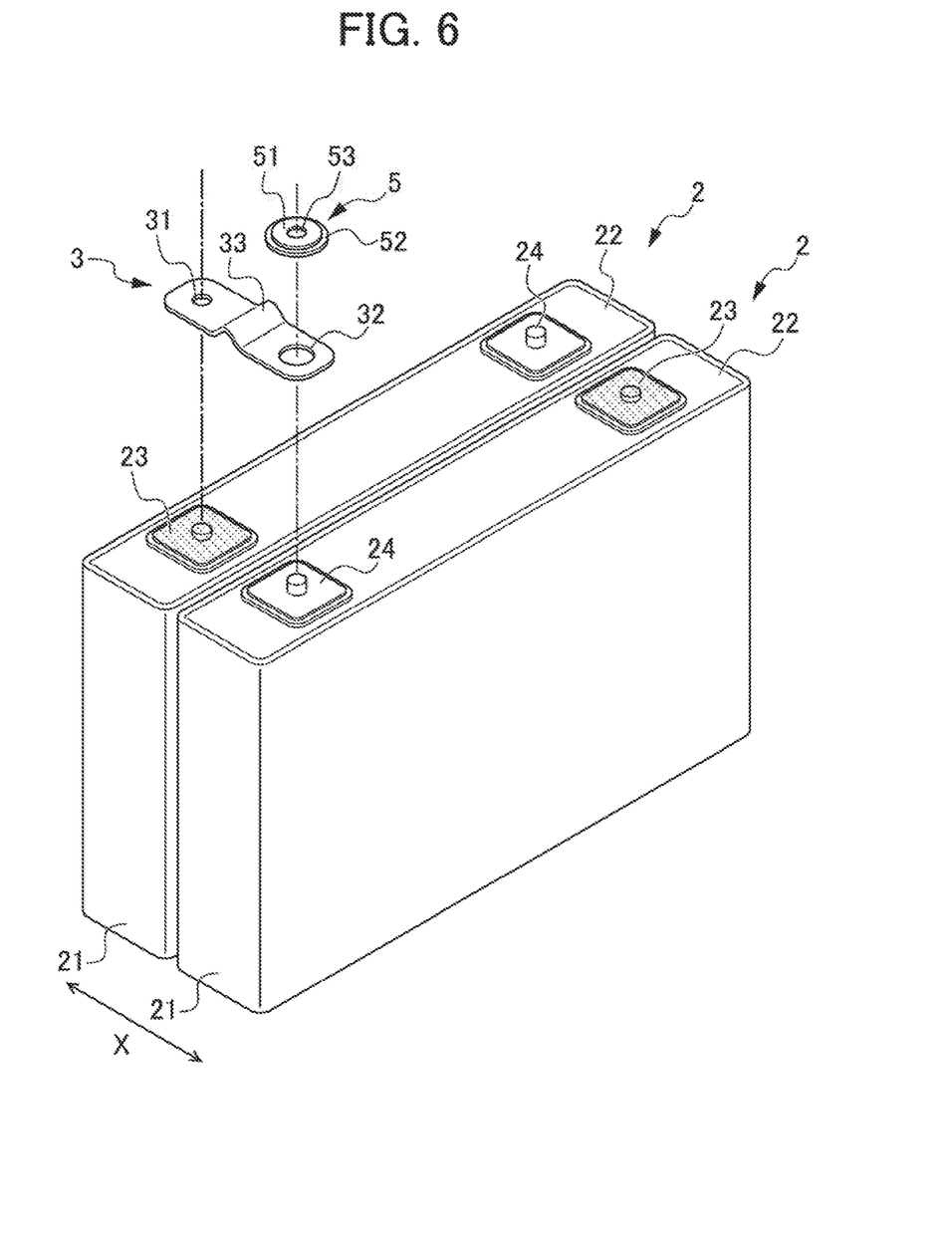
FIG. 6 is an exploded perspective view showing two adjacent battery cells in a battery pack according to a second embodiment.
Figure 7:
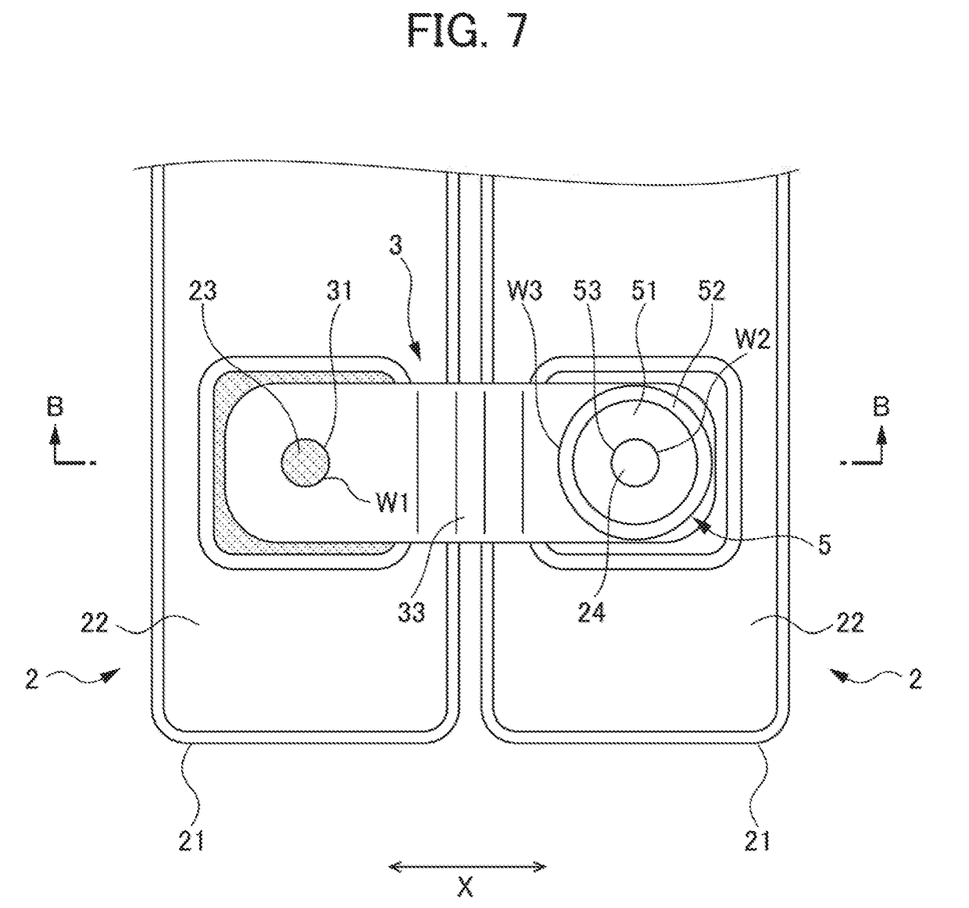
FIG. 7 is an enlarged plan view showing a connecting portion between one of the electrode terminals in two adjacent battery cells.
Figure 8:
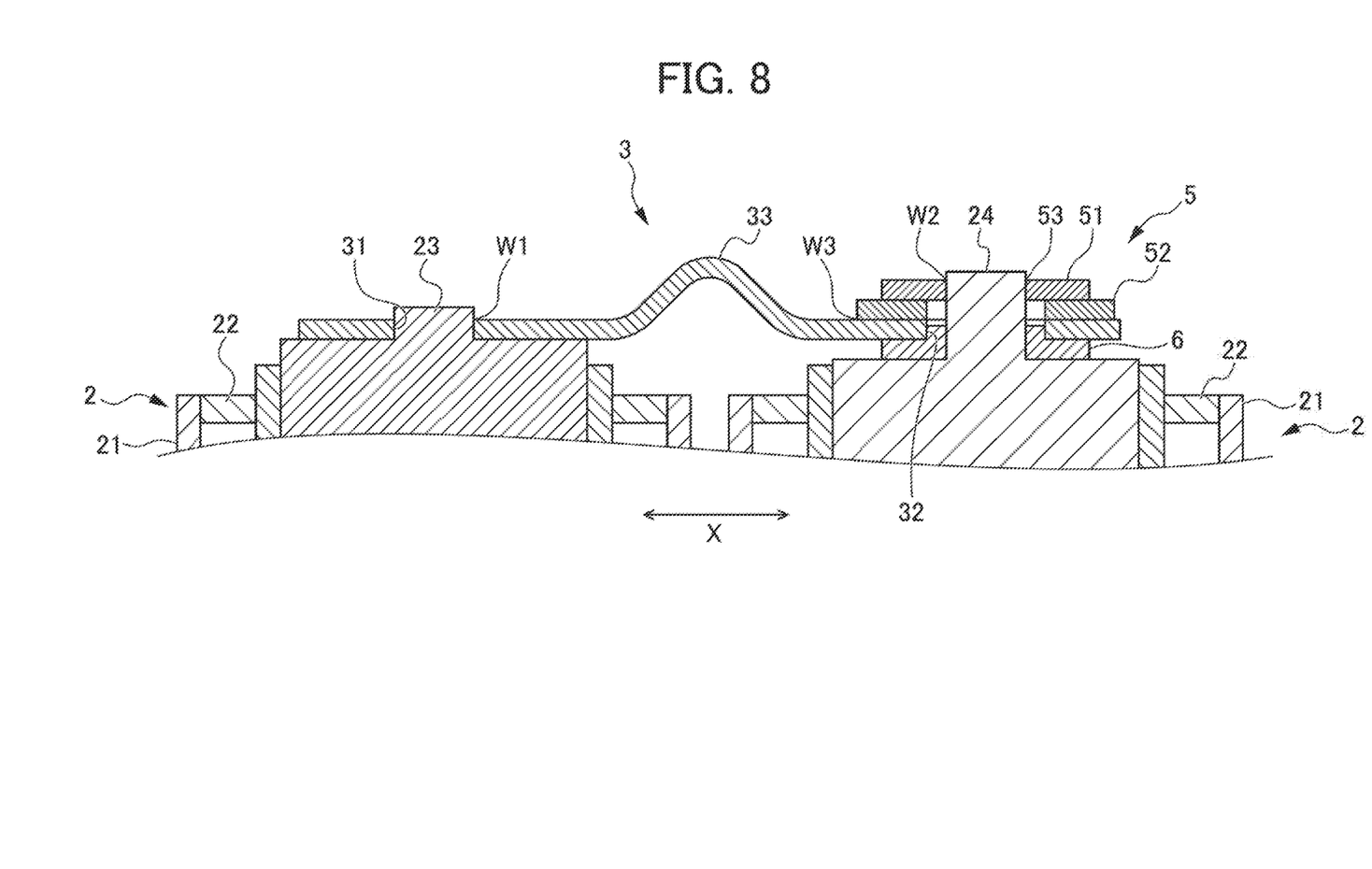
FIG. 8 is a cross-sectional view taken along line B-B in FIG. 7.
Figure 9:
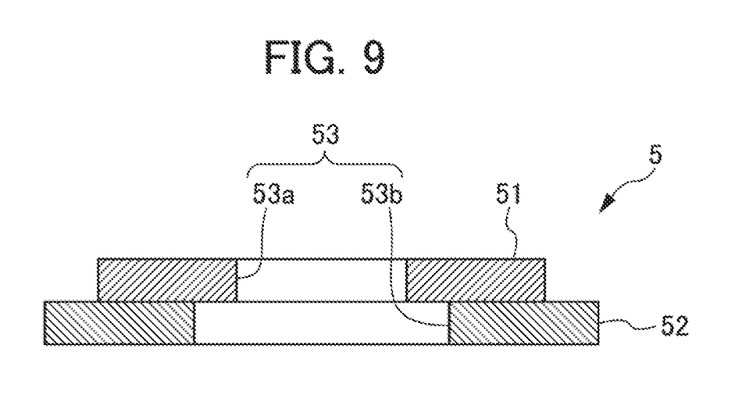
FIG. 9 is a longitudinal cross-sectional view of a dissimilar material bonding plate in the second embodiment.

FIG. 6 is an exploded perspective view showing two adjacent battery cells in a battery pack according to the second embodiment. FIG. 7 is an enlarged plan view showing a connecting portion between one of the electrode terminals in two adjacent battery cells. FIG. 8 is a cross-sectional view taken along line B-B in FIG. 7. FIG. 9 is a longitudinal cross-sectional view of a dissimilar material bonding plate in the second embodiment.

In the battery pack 10 according to the second embodiment, since parts having the same reference numerals as those of the battery pack 1 according to the first embodiment indicate parts having the same configuration, the description thereof will adopt the description in the first embodiment, and is omitted below. The second embodiment, similarly to the first, embodiment, shows a case of the battery cell 2 in which the positive electrode terminal 23 is formed of an aluminum alloy and the negative electrode terminal 24 is a lithium ion battery cell formed of a copper alloy.

In the present embodiment, the configuration of a dissimilar material bonding plate 5 disposed above one of the two terminal connection holes 31 and 32 of the metal plate 3 (the terminal connection hole 32 in the present embodiment) is different from the configuration of the dissimilar material bonding plate 4 of the first embodiment. That is, the dissimilar material bonding plate 5 is common to the dissimilar material bonding plate 4 in the first embodiment in that at least two plates made of different metals, that is, a first plate 51 and a second plate 52 having an outer diameter larger than that of the first plate 51, are stacked, and in that the first plate 51 is formed of metals of the same element as that of the negative electrode terminal 24, that is, a copper alloy, and the second plate 52 is formed of metals of the same element as that of the metal plate 3, that is, an aluminum alloy, respectively. However, the dissimilar material bonding plate 5 of the present embodiment differs from the dissimilar material bonding plate 4 of the first embodiment in that the first plate 51 and the second plate 52 are stacked in the thickness direction.

Specifically, the dissimilar material bonding plate 5 is bonded in advance by a suitable method such as diffusion bonding or ultrasonic bonding so that the first plate 51 is stacked on the upper surface of the second plate 52 and the first plate 51 and the second plate 52 are in a conductive state. As shown in FIG. 7, since the outer diameter of the second plate 52 is larger than the outer diameter of the first plate 51, when observing the dissimilar material bonding plate 5 from the side of the first plate 51, the second plate 52 is disposed so as to extend outwardly in the radial direction of the first plate 51.

A terminal insertion hole 53 disposed in the central portion of the dissimilar material bonding plate 5 is formed so as to penetrate the first plate 51 and the second plate 52. Specifically, as shown in FIG. 9, the terminal insertion hole 53 is configured by communicating the first insertion hole 53a formed in the first plate 51 with the second insertion hole 53b formed in the second plate 52. The first insertion hole 53a has substantially the same diameter as the outer diameter of a portion which is to be inserted into the terminal insertion hole 53 at the negative electrode terminal 24. On the other hand, the second insertion hole 53b has a diameter smaller than the outer diameter of the first plate 51. However, the second insertion hole 53b is formed to have a diameter larger than that of the first insertion hole 53a, and has substantially the same diameter as that of the terminal connection hole 32 of the metal plate 3.

It should be noted that, as shown in FIGS. 6 and 7, the outer shapes of the first plate 51 and the second plate 52 of the present embodiment, are also formed in an annular disk shape, and are stacked in the thickness direction so as to be concentric with each other. However, the external shapes of the first plate 51 and the second plate 52 of the dissimilar material bonding plate 5 are not limited thereto.

By inserting the negative electrode terminal 24 extending through the terminal connection hole 32 of the metal plate 3 into the terminal insertion hole 53, as shown in FIG. 8, the dissimilar material bonding plate 5 is placed on the upper surface of the metal, plate 3 around the terminal connection hole 32. The second plate 52 is disposed below so as to be in contact with the metal plate 3. The first plate 51 is disposed above. Thereafter, as shown in FIGS. 7 and 8, a welded portion W2 is formed by performing laser welding along the contact portion between inner periphery of the terminal insertion hole 53 (the first insertion hole 53a) of the first plate 51 and the outer periphery of the negative electrode terminal 24. Furthermore, a welded portion W3 is formed by performing laser welding along the contact portion between the outer periphery of the second plate 52 and the metal plate 3. The welded portion W2 is a welded portion by metals of the same element of the copper alloy (the negative electrode terminal 24) and the copper alloy (the first plate 51). The welded portion W3 is a welded portion by metals of the same element of the aluminum alloy (the metal plate 3) and the aluminum alloy (the second plate 52). Therefore, since any of the welded portions W2 and W3 is a welded portion by metals of the same element, there is no possibility that different metal materials are mixed, and thus, it is possible to increase reliability of the connection strength by welding between the metal plate 3, and the positive electrode terminal 23 and the negative electrode terminal 24. Moreover, since it is not necessary to use an expensive clad material for the metal plate 3, it is possible to configure the battery pack 1 at a low cost.

Therefore, according to the battery pack 1 according to the second embodiment, with the dissimilar material bonding plate 5, the welded portions W1, W2, and W3 for electrical connection between the metal plate 3, and the positive electrode terminal 23 and the negative electrode terminal 24 can be configured by metals of the same element without using an expensive clad material to the metal plate 3. Therefore, the same effect as the first embodiment in which it is possible to increase reliability of the connection strength by welding between the metal plate 3, and the positive electrode terminal 23 and the negative electrode terminal 24 at a low cost can be obtained.

As shown in FIG. 8, an insulating member 6 made of an insulating material such as resin is disposed between the metal plate 3 and the negative electrode terminal 24 which is to be inserted into the terminal insertion hole 53 of the dissimilar material bonding plate 5. The insulating member 6 is provided over the lower surface of the metal plate 3 from between the inner peripheral surface of the terminal connection hole 32 of the metal plate 3 and the outer peripheral surface of the negative electrode terminal 24 that is inserted into the terminal connection hole 32. With such a configuration, the negative electrode terminal 24 is insulated from the metal plate 3, and the direct contact therebetween is prevented. Therefore, electrolytic corrosion due to contact between the different metals of the negative electrode terminal 2A and the metal plate 3 is prevented, and hence, it is possible to maintain a low-resistance connection state over a long period of time.

It should be noted that the upper end of the insulating member 6 shown in FIG. 8 is formed so as not to interfere with the terminal insertion hole 53 of the dissimilar material bonding plate 5. However, the upper end of the insulating member 6 may extend between the inner peripheral surface of the second insertion hole 53b of the second plate 52 in the dissimilar material bonding plate 5 and the outer peripheral surface of the negative electrode terminal 24. Such an insulating member 6 can be similarly applied between the negative electrode terminal 24 and the metal plate 3 in the first embodiment.

Other Embodiments

In the battery pack 1 according to the above embodiments, the positive electrode terminal 23 of the battery cell 2 is an aluminum alloy, the negative electrode terminal 24 is a copper alloy, and the metal plate 3 is an aluminum alloy. However, it suffices if the battery pack 1 is configured such that the metal plate 3, and at least one of the positive electrode terminal 23 and the negative electrode terminal 24 is formed of different metals, and the present invention is not limited to the combination of such an aluminum alloy and a copper alloy.

Even in the case of using metal materials of elements other than an aluminum alloy and a copper alloy as the first plates 41 and 51 and the second plates 42 and 52 of the dissimilar material bonding plates 4 and 5, it is preferable for the tensile strength of the first, plates 41 and 51 to foe larger than the tensile strength of the second plates 42 and 52. With such a configuration, since the strength of the first plates 41 and 51 having relatively short weld length can be increased, it is possible to further improve reliability of the connection strength.

Furthermore, in the metal plate 3, by forming of a metal having a smaller density than the metal forming at least one of the positive electrode terminal 23 and the negative electrode terminal 24, it is possible to reduce the weight and cost of the battery pack 1.

What is claimed is:

1. A battery pack comprising:
a plurality of battery cells that is stacked and includes positive and negative electrode terminals, the plurality of battery cells being serially connected by connecting the positive electrode terminal of one battery cell with the negative electrode terminal of another battery cell adjacent to the one battery cell, by metal plates each having two terminal connection holes into which the respective electrode terminals are inserted,
wherein at least one of the two terminal connection holes is a first terminal connection hole including a long hole or a loose hole that allows the electrode terminal inserted into the terminal connection hole to move in a stacking direction of the battery cells; and
a dissimilar material bonding plate, wherein at least one of the positive and negative electrodes is composed of a different metal from the metal plates, and the at least one of the positive and negative electrode terminals composed of the different metal from the metal plates is inserted into the first terminal connection hole, and the dissimilar material bonding plate having a terminal insertion hole into which the electrode terminal extending through the first terminal connection hole is inserted is disposed above the first terminal connection hole,
wherein the dissimilar material bonding plate includes a stack of a first plate and a second plate that are composed of different metals from each other, and an outer diameter of the second plate is larger than that of the first plate,
wherein the dissimilar material bonding plate is provided in an integral annular shape by bonding only an outer peripheral surface of the first plate having an annular shape and an inner peripheral surface of the second plate having an annular shape and disposed outside the outer peripheral surface with each other, and the terminal insertion hole is defined by the inner peripheral surface of the first plate,
wherein the first plate is composed of a metal of the same element as a metal that forms the electrode terminal that is inserted into the terminal insertion hole, and welded to the electrode terminal that is inserted into the terminal insertion hole, and
wherein the second plate is composed of a metal of the same element as a metal that forms the metal plate, and welded to the metal plate.

2. The battery pack according to claim 1, wherein an insulating member is disposed between the metal plate and the electrode terminal that is inserted into the terminal insertion hole of the dissimilar material bonding plate.

3. The battery pack according to claim 1, wherein the dissimilar material bonding plate comprises a clad tube.

4. The battery pack according to claim 1,
wherein the positive and negative electrode terminals are respectively an aluminum alloy and a copper ahoy,
the metal plate is an aluminum alloy,
the first plate of the dissimilar material bonding plate is a copper alloy, and the second plate of the dissimilar material bonding plate is an aluminum alloy, and the battery cells are lithium-ion battery cells.

5. The battery pack according to claim 1, wherein tensile strength of the first plate is larger than tensile strength of the second plate.

6. The battery pack according to claim 1, wherein the metal plate is composed of a metal having a smaller density than a metal forming at least one of the positive and negative electrode terminals.

\* \* \* \* \*